United States Patent [19]

Mitsam

[11] Patent Number: 4,802,949
[45] Date of Patent: Feb. 7, 1989

[54] APPARATUS FOR APPLYING AN EMBOSSING FOIL TO A FLEXIBLE MATERIAL

[75] Inventor: Reinwald Mitsam, Zirndorf, Fed. Rep. of Germany

[73] Assignee: Leonard Kurz, Furth, Fed. Rep. of Germany

[21] Appl. No.: 71,893

[22] Filed: Jul. 10, 1987

Related U.S. Application Data

[60] Division of Ser. No. 742,216, Jun. 6, 1985, Pat. No. 4,701,235, which is a continuation of Ser. No. 476,192, Mar. 17, 1983, abandoned.

[30] Foreign Application Priority Data

May 6, 1983 [DE] Fed. Rep. of Germany ....... 3210551

[51] Int. Cl.⁴ .................. B44C 1/16; B32B 31/00; B30B 5/02
[52] U.S. Cl. .................. 156/540; 156/582; 156/583.91; 156/238; 100/93 RP
[58] Field of Search .............. 156/539, 540, 541, 552, 156/555, 556, 580, 582, 583.91, 219, 220, 221, 230, 238, 240, 249, 583.8, 583.9; 100/38, 90 RP, 211; 264/119, 241, 280, 284, 293, 294, 296; 425/328, 409

[56] References Cited

U.S. PATENT DOCUMENTS

| | | | |
|---|---|---|---|
| 3,689,350 | 9/1972 | Renaut | 156/238 |
| 3,737,351 | 6/1973 | Ettel | 156/582 |
| 3,863,562 | 2/1975 | Jack | 100/211 |
| 3,890,193 | 6/1975 | Cartabbia | 156/582 |
| 3,948,709 | 4/1976 | Ida et al. | 156/582 |
| 4,016,026 | 4/1977 | Grevich | 156/555 |
| 4,151,033 | 4/1979 | Metzger | 156/249 |
| 4,175,993 | 11/1979 | Robertson | 156/540 |
| 4,326,910 | 4/1982 | Davis | 156/238 |
| 4,354,819 | 10/1982 | Wirz | 425/409 |
| 4,371,414 | 2/1983 | Ahrweiler | 156/580 |
| 4,382,831 | 5/1983 | Clough et al. | 156/249 |
| 4,400,227 | 8/1983 | Riemersma | 156/582 |

Primary Examiner—Michael W. Ball
Assistant Examiner—Louis Falasco
Attorney, Agent, or Firm—Louis E. Marn

[57] ABSTRACT

An apparatus for applying an embossing foil to a portion of flexible material comprises passing the material with the foil thereon over a substantial distance along a heated surface of a support member such as a roller. The material and the foil are jointly pressed against the heated surface of the support member, and thus against each other by a plurality of pressure rollers disposed at a spacing from each other along the heated surface. Apparatus for carrying out the invention comprises an array of pressure elements such as rollers such that the rollers can be applied against a support roller in a progressive mode of actuation starting from the center of the pressure roller array and moving outwardly towards the ends thereof. The support roller is driven by a variable drive means or an adjustable-torque slipping clutch.

15 Claims, 2 Drawing Sheets

APPARATUS FOR APPLYING AN EMBOSSING FOIL TO A FLEXIBLE MATERIAL

This is a division of application Ser. No. 742,216 filed June 6, 1985 now U.S. Pat. No. 4,701,235 which is a continuation of Ser. No. 476,192.

BACKGROUND OF THE INVENTION

The invention relates to a method of applying an embossing foil to a flexible portion of material such as a strip or web of material. Such a foil comprises for example a decorative or textured layer or film carried on a backing member, with the film being applied to the material to be decorated by being pressed thereagainst, at the same time as heat is applied. After the material has cooled down, the backing member of the foil is removed, leaving decoration, texturing or other patterning on the web of material in question. Such a foil is referred to herein as an embossing foil.

The invention also relates to an apparatus for performing such a method.

It is already known for webs of material in strip form to be decorated with hot embossing foils of the general kind indicated above. The mode of operation in that connection is generally that the web of material, in conjunction with the embossing foil, is passed through a slot between a heated cylinder and a pressure roller, that procedure therefore basically comprising a calandering process. However, that process suffers from some serious disadvantages. On the one hand, the operating speeds which can be attained are generally very low because heat has to be applied to the embossing foil and the web of material to be decorated thereby, for a certain minimum period of time if a satisfactory join between the foil and the web of material is to be achieved. In addition, there is the danger that the embossing may turn out to be defective as the action of heat and pressure is generally only over a small, virtually linear region, in consideration of the fact that the pressure as between the foil and web of material to which it is to be applied is produced between a single heated cylinder and a single pressure roller. If the temperature of the embossing heated cylinder is increased, then there is the possibility of either the web of material or the embossing foil suffering from damage as a result. Therefore, the known process is subject to fairly restricting conditions.

In an attempt to improve the above-discussed process, it has been suggested that the web of material to be decorated, together with the embossing foil, may be passed successively through a plurality of gaps each formed by a heated cylinder and a pressure roller. However, that mode of operation resulted in virtually no improvement of substance, in comparison with the process using just a single pressing gap. On the contrary, it was even observed in some circumstances that the embossing results were worse. That was because the material to be decorated and the embossing foil cooled down relatively quickly after leaving a gap between a pressure roller and a heated cylinder, with the result that the materials had to be virtually completely heated up to operating temperature again in the next following gap. Cooling the foil can also have the result that the pattern produced is distorted due to shrinkage in the foil. Such defects in the decoration effect produced are then-so-to-speak fixed when the material and foil then passes through further working gaps.

SUMMARY OF THE INVENTION

An object of the present invention is to overcome the disadvantages of the above-discussed methods and apparatus.

A further object of the present invention is to provide a method of fixedly applying an embossing or textured foil or film to a flexible web of material at high operating speed.

Another object of the invention is to provide a method of applying an embossing or decorative foil to a web of material securely but without detrimentally affecting the quality of either the material or the decorative foil.

Yet another object of the present invention is to provide a method of applying a decorative foil to a flexible strip of material which involves repeatedly pressing the foil against the material, thereby obviating the need for an operating temperature such as detrimentally to affect the materials used.

A still further object of the present invention is to provide a method of applying a decorative foil to a strip of material without repeatedly heating the material and/or foil in a plurality of separated heating operations.

Still another object of the invention is to provide an apparatus for applying a decorative or embossing foil to a web of material, which has only a single heating station for heating the materials concerned.

A still further object of the present invention is to provide such an apparatus which permits continuous operation in a satisfactory manner without detrimentally affecting the materials concerned.

Yet another object of the invention is to provide such an apparatus which facilitates inserting the web of material and the foil into the apparatus in the start-up phase.

Yet a furher object of the invention is to provide an apparatus for applying an embossing or decorative foil to a strip of material, which is amenable to entirely automated operation.

Still another object of the invention is to provide such an apparatus, which enables the materials passing through the apparatus to be maintained under an at least substantially constant tension.

These and other objects are achieved by a method for applying an embossing or textured or decorative film or foil to a flexible material, for example in the form of a strip or elongate web, wherein a hot embossing foil in strip form is heated and at the same time pressed by means of at least one pressure roller against the web of material to which it is to be secured, with the web of material being supported against a heated surface of a support member such as a roller. After the foil and the material have been pressed together and then cooled down, the carrier or backing member of the foil is pulled off the decorative layer of the foil, so that the decorative layer remains on the web of material to be decorated thereby. To ensure satisfactory heating, without detrimentally affecting the materials involved, the web of material and the foil lying thereon are passed for a substantial distance along a heated surface of the support member, thereby to ensure uniform heating of the assembly to the desired temperature. The web of material and the foil are jointly pressed against each other and against the heated surface of the support member, by the plurality of pressure rollers which are disposed at a spacing from each other along the heated support member surface.

Therefore, the method according to the invention comprises passing the web of material with the embossing foil thereon through a plurality of successive operating gaps, in each of which the foil is pressed against the web of material by at least one pressure roller. The major differnce between the method in accordance with this invention and the previously discussed operating procedures is that the web of material with the embossing foil thereon is always in a heated condition as it passes between the individual gaps so that it has no opportunity to cool down in the spaces between the various pressure rollers. In this way, the operating speed can be quite considerably increased in comparison with the known method. In the case of the latter, it was generally impossible to operate at speeds of higher than 30 meters of material per minute, whereas the method according to the invention permits operating speeds of more than 150 meters per minute, so that the operating speed can be increased by up to or even more than five times. Because there is no cooling of the material beween the individual pressure locations, there is also no real danger of the decorative image produced by the foil on the material suffering from distortion. Therefore, not only does the method according to the invention permit a considerable increase in operating speed but also a quite significant improvement in the quality of the embossing pattern or decoration produced.

In order to achieve high operating speeds, it is desirable for the backing or support member to be in the form of a heated roller or cylinder which may be of a suitably large radius.

In order substantially to prevent the possibility of damage to the web of material and defects in the embossing pattern or configuration produced, it is also desirable for the tension in the web of material which is passed over the heated backing member or cylinder to be maintained substantially constant.

The invention also provides an apparatus for carrying out the above-discussed method of the invention, comprising a backing member such as an embossing cylinder or roller, with a plurality of pressure rollers arranged at a spacing therefrom, around at least a part of the periphery thereof, the pressure rollers having their axes parallel to each other and to the axis of the embossing roller and being individually adjustable in such a way that they can be selectively applied to the embossing roller, in a predetermined sequence; more particularly, where the arrangement has a multiplicity of such pressure rollers arranged in succession around part of the periphery of the embossing roller, one or more adjacent pressure rollers which are inner rollers of the array are first moved into a position of engaging the embossing roller to press the web of material and the foil thereagainst, and then further pressure rollers, at progressively further outwardly disposed locations in the array of pressure rollers, are then caused to come into positions of engagement with the embossing roller.

The above-indicated construction of the apparatus according to the invention considerably facilitates the initial and terminating phases of operation of the apparatus, that is to say, starting up and concluding an embossing operation. If in fact the pressure rollers were not disposed and operated in the manner briefly indicated above and described in greater detail hereinafter, there would be the risk that the web of material with the embossing foil thereon might be heated to an excessively high temperature, at least in part thereof, during the operation of threading the web of material and the embossing foil into the gaps between the pressure rollers and the embossing roller, with the result that the material might be prematurely activated and thus secured to the embossing foil in the incorrect relative positions. It would therefore no longer be possible to produce a satisactory embossing connection between the foil and the material in that already embossed region of the material. There might even be the danger that, as a result of severe overheating of the material and the foil, the material and foil might suffer from damage, which is generally unacceptable, particularly when the material and the foil are expensive. However, by progressively constituting the part-circular array of pressure rollers around the embossing roller, working from the middle of the array outwardly towards the ends thereof, in the peripheral direction of the embossing roller, that ensures that the web of material and the embossing foil cannot be overheated and thus prematurely activated anywhere therealong. In addition, it is very much easier to insert the foil and the web of material to be decorated thereby into the apparatus.

In practice, it has been found desirable for the apparatus to be of such a configuration that the pressure rollers are arranged in two groups symmetrically with respect to the embossing roller, with the pressure rollers of the two groups, which respectively correspond to each other relative to the plane of symmetry of the array of rollers, being movable in the same manner. A preferred embodiment in this respect provides that each group of pressure rollers comprises four such rollers, with each two of said four rollers being mounted closely adjacent to each other on respective first and second rocker members. The two rocker members are pivotal about respective axes, which are parallel to the axes of rotation of the pressure rollers, on respective ones of first and second angle levers or bell crank levers. The first angle lever of each group of four rollers as referred to above, being the angle lever carrying the rocker member which mounts the inner two rollers of that group, is mounted pivotally on a main axis which is parallel to the axes of the pressure rollers and embossing roller. The first angle lever can be pivoted about said main axis by means of a first control drive means which engages the respective angle lever substantially centrally thereof, actuation of the control means causing the angle lever to pivot about its said main axis, thereby to move the pressure rollers supported by the rocker member carried by that angle lever into a position of co-operating with the embossing roller, to press the material and foil against the periphery of the embossing roller. The second angle lever of each of the above-mentioned groups is mounted substantially centrally thereof, on a carrier member which is also pivotal about the respective main axis, referred to above in connection with the first angle lever. The second angle lever is also movable jointly with the carrier member, by means of a second control drive means which engages the second angle lever at the second end thereof, with the respective rocker member being mounted on the first end. As will be seen hereinafter, that construction permits the pressure rollers to be moved successively into their positions of co-operating with the embossing roller, in the desired progressive manner.

The outer pressure rollers of the respective groups are advantageously caused to move into their positions of co-operating with the embossing roller by the second angle lever of the respective group being spring-loaded towards a rest position relative to the carrier member, while, when the carrier member reaches a pivotal position which is sufficient to cause the pressure rollers mounted on the second rocker member of that group to co-operate with the embossing roller, in which position the carrier member bears against a suitable abutment means, the second angle lever can be pivoted out of its rest position towards the embossing roller against the action of the spring loading, by means of the second control drive means. As a result of the interconnection of the pivoting or swing movements of the carrier member and the respective second angle lever and the action of preventing the second angle lever from pivoting during the pivotal movement of the respective carrier member, the arrangement produces a quite specific motion which causes the outer pressure rollers of the respective groups to come to bear cleanly and tidily against the embossing roller.

The invention further provides that the embossing roller is driven by means of a separate controllable drive, for example a direct current motor, or alternatively by way of a slipping clutch which has an adjustable torque output, for example an electrical magnetic powder clutch means. In that way, it is possible for the speed of rotation of the embossing roller to be adapted to the material to be processed, and in particular its speed of rotation can be precisely matched to the speed at which the embossed web of material, or the backing member of the foil after it has been detached from the web after the embossing operation is for example wound onto a storage reel. Precise matching of speeds in that way is important for the reason that it is only in that manner that it is possible to ensure that the tension in the web of material is uniform, after leaving the embossing area or station. However, it will be appreciated that uniform tensioning of that kind is necessary in order to achieve a good embossing result.

In order to control the torque of the slipping clutch or the drive provided by the separate drive means for the embossing roller, the apparatus preferably has a dancer roller which is displaceable in dependence on the tension in the web of material, in the direction in which it passes through the apparatus, downstream of the embossing roller. For that purpose, the web of material is guided in a loop confiruration around the dancer roller, the loop becoming shorter when the tension in the web of material increases and longer as the tension falls. The dancer roller thus moves in dependence on the tension in the web of material and controls the drive means or the slipping clutch by way of per se known means for example electronic components, thereby varying the torque produced by the drive means for driving the embossing roller or the speed of rotation of the drive.

In addition, in order to achieve even better results, it has been found desirable for the apparatus to include means for maintaining a constant tension in the web of material and the embossing foil between appropriate supply rolls feeding the web of material and the embossing foil into the apparatus, and the embossing station comprising the embossing roller. A constant tension may be achieved by a suitable arrangement of braking means on the supply rolls and/or separate braking rollers co-operating with the web of material and/or the embossing foil respectively, to retard same as it passes into the embossing station.

Further objects, features and advantages of the present invention will be apparent from the following description of a preferred embodiment given by way of example of an apparatus for carrying out a method in accordance with the principles of the present invention.

DESCRIPTION OF THE PREFERRED EMBODIMENT

Figure 1:
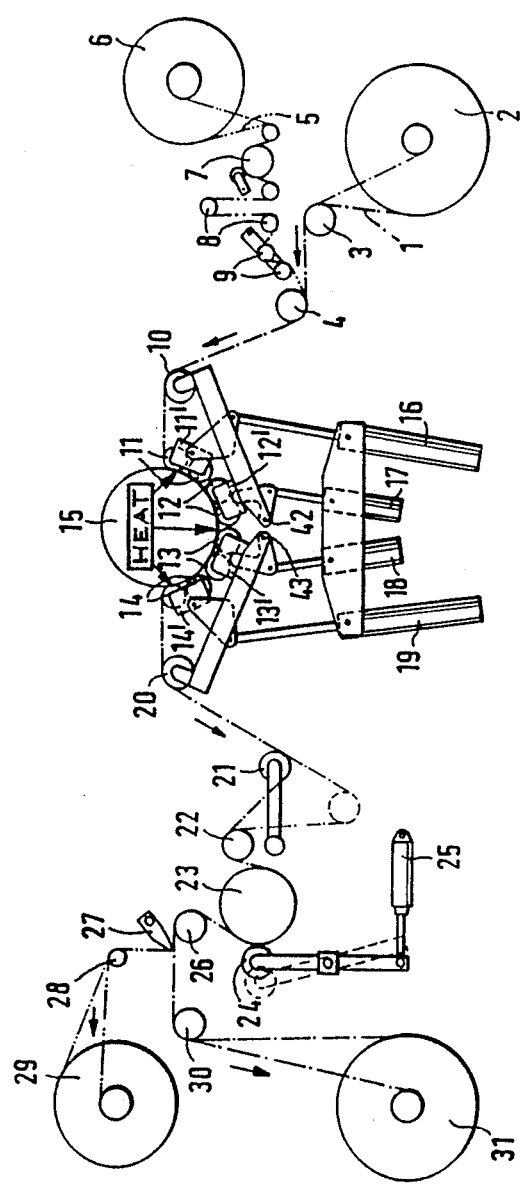
FIG. 1 is a side view of the essential components of an apparatus for carrying out a method, in accordance with the basic principles of the present invention.
Figure 2:
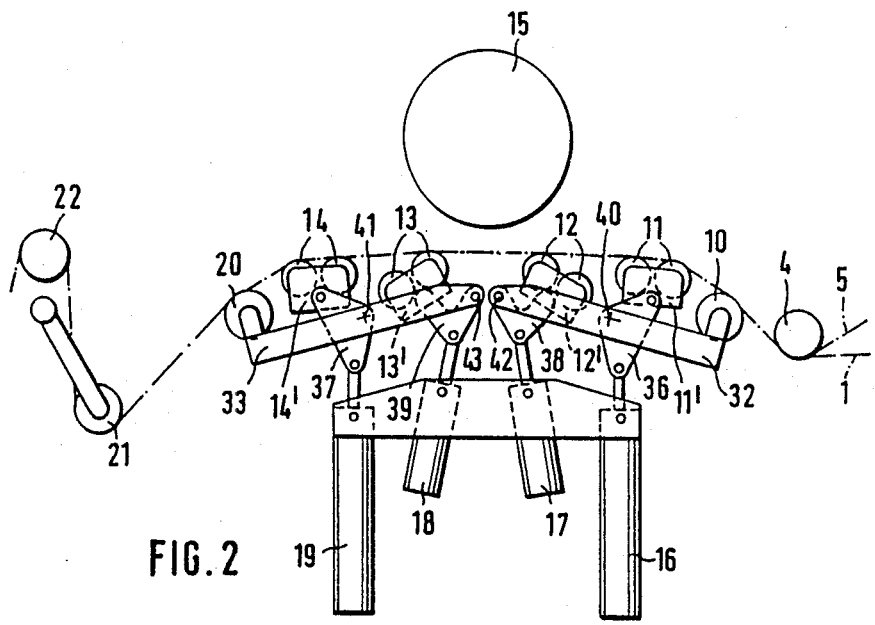
FIG. 2 is a view on an enlarged scale of part of the FIG. 1 apparatus, with the embossing roller and pressure rollers, wherein the pressure rollers are disposed at a position which permits a portion of material to be inserted at the beginning of the operating procedure of the machine.
Figure 3:
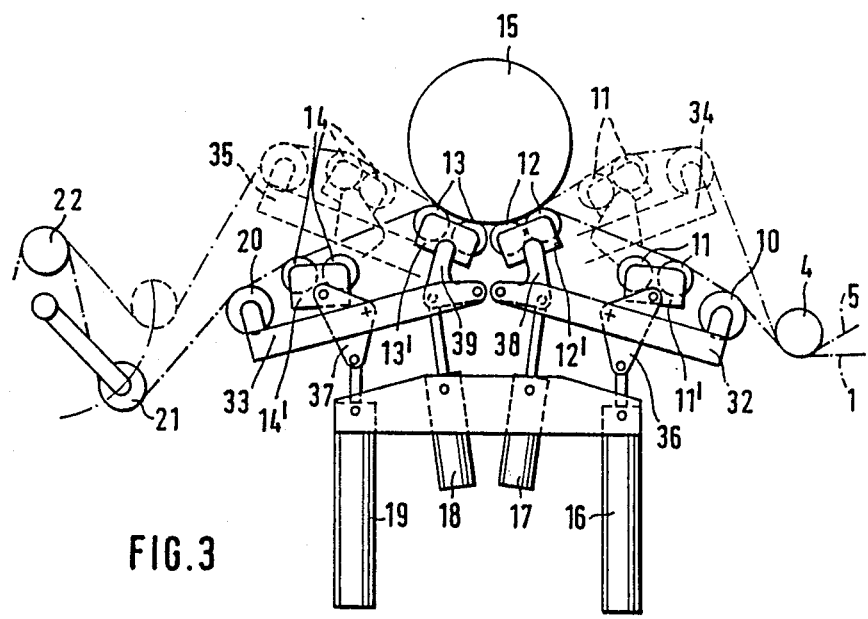
FIG. 3 shows a view corresponding to that shown in FIG. 2 but with some of the pressure rollers already applied to the embossing roller, with the other rollers shown in solid lines in their inoperative position in which they are well spaced on the embossing roller, and in dash-dotted lines in their position in which they have been moved towards the embossing roller for engagement therewith.

Referring firstly to FIG. 1, reference numeral 1 therein denotes a web or portion of material 1 which is to be processed, the web 1 being drawn from a supply roll 2 and passing over guide rollers 3 and 4 to the actual embossing station which is also shown, on an enlarged scale, in Figures 2 and 3. A suitable brake means acts on the supply roll 2, for example by engaging the rotary shaft thereof, in order thereby to maitain an at least substantially constant tension in the web of material 1 as it passes from the supply roll 2 through the remainder of the apparatus.

Reference numeral 5 in FIG. 1 denotes an embossing or decorative film or foil which is also stored on a supply roll 6. As it leaves the supply roll 6, the foil 5 passes around a first guide roller to a braking roller 7. The foil then passes over further guide rollers 8 and 9 and thus arrives at a guide roller 4 where it then comes into contact with and runs onto the web of material 1 coming from the supply roll 2 by way of the roller 3. The tension in the strip of foil coming from the supply roll 6 can be maintained substantially constant, by means of the braking roller 7, independently of the diameter of the material wound on the supply roller 6.

The assembly comprising the two layers of material, namely the web 1 and the foil 5, passes from the roll 4 at which the two webs of material are brought together, over a guide roller 10 and into a gap between the pairs of pressure rollers 11, 12, 13 and 14 and the heated embossing roller or cylinder 15. The pairs of pressure rollers 11, 12, 13 and 14 press the web of material 1 and the foil 5 firmly against the embossing roller 15, by means of piston-cylinder units 16, 17, 18 and 19 which thus act as control means, thereby to produce the embossing pressure required. It will be noted that the arrangement of the pressure rollers 11 through 14, in relation to and around the roller 15, is such that the web of material 1 and the foil 5 in contact therewith pass around the roller 15 over a peripheral or angular distance of about 170°, as can be most clearly seen from FIG. 1.

After having passed through the portion of its travel in which it extends around and in contact with the roller 15, the composite material formed by the web 1 and the foil 5 thereon passes over a further guide roller 20 which is therefore disposed at the downstream side of the embossing station 11 through 14, 15. From the roller 20, the embossed web of material with the foil 5 now embossed thereon passes around a dancer roller 21 and goes to a further guide roller 22 and a cooling roller or cylinder 23. On the one hand, the cooling cylinder 23 is provided for cooling down the web of material which, as will be described in greater detail hereinafter, is heated in passing around the roller 15. On the other hand, the cooling cylinder 23 is driven and draws the web of material with the foil 5 thereon out of the embossing station 11 through 14, 15. The mode of operation and the purpose of the dancer roller 21 will be described in greater detail hereinafter.

In order to ensure that the web of material 1 with the embossed foil 5 thereon does not slip relative to the cooling cylinder 23 and is thus satisfactorily drawn from the embossing station, the apparatus also includes a rubber-coated pressure roller 24 which is pressed against the peripheral surface of the cooling cylinder 23, as by a piston-cylinder unit indicated at 25.

Subsequently to the coolng cylinder 23, the material comprising the web 1 and the foil 5 passes over a further guide roller 26. Disposed downstream of the guide roller 26, as viewing in the direction of movement of the material 1, 5 through the apparatus, is an adjustable edge member which is provided to loosen or disengage the support or backing member of the foil 5 from the web of material 1 so that all that remains on the web 1 is the decorative layer originally carried on the backing member of the foil 5. The backing member of the foil 5 is then taken by way of a guide roller 28 to a wind-on roller 29, while the decorated web of material 1 passes over a guide roller 30 to a wind-on reel 31.

In the illustrated embodiment of the apparatus in accordance with the principles of this invention, the cooling cylinder 23 is driven for example by a controllable d.c. motor. That is the main or governing drive means, which determines the speed of decorative embossing operation of the apparatus.

The roller 15 is driven by a further d.c. motor, the transmission arrangement for transmitting the drive from the motor to the roller 15 being of such a design that it is possible for the peripheral speed of the roller 15 to be somewhat higher than the peripheral speed of the cooling cylinder 23. However, the roller 15 and the cylinder 23 must run in a mutually synchronised condition. For that purpose, the speed of rotation of the drive means for the roller 15 may be altered, for example also by way of a change in its torque. The dancer roller 21 serves to adjust the rotary speed of the d.c. motor drive or the peripheral speed of the roller 15. When the dance roller 21 moves dowwardly as viewed in FIG. 1, that means that the embossing roller 15 is running at a higher speed than the cooling cylinder 23, in which case the rotary speed of the roller 15 is reduced accordingly. The result of that is that the dancer roller 21 then moves upwardly. When the dancer roller 21 moves upwardly in FIG. 1, the peripheral speed of the roller 15 is increased. Tests have shown that only a short period of time is required for the dancer roller 21 to take up an at least approximately stable position. In this way it is possible readily to achieve a condition of satisfactory synchronisation in respect of the peripheral speeds of the roller 15 and the cooling cylinder 23.

When, in an alternative form, the apparatus uses a slipping clutch which has a variable drive torque, the drive for the heated roller 15 is so designed that the roller 15 normally rotates at a higher peripheral speed than the cooling cylinder 23. Altering the torque transmitted, by means of the dancer roller 21, and in dependence on the braking or retardation forces acting on the cylinder 15 in operation of the apparatus, due to the pulling force applied thereto by the web of material 1 passing through the apparatus, means that the actual peripheral speed of the roller 15 can then be adapted to that of the cooling cylinder 23.

Reference will now be made more particularly to Figures 2 and 3 which show constructional details of a specific embodiment of the embossing station for applying the foil 5 to the web of material 1 which is to be decorated thereby.

First of all however, still referring to FIG. 1, it will be seen that it is very difficult if not impossible for the pressure rollers 11 through 14 to be already arranged in a pressure-applying configuration around the heated embossing roller 15 when starting up operation of the apparatus, that is to say, when the web 1 and the foil 5 are to be inserted into the embossing station formed by the rollers 11 through 15. More specifically, if the attempt were made to feed the web 1 and the foil 5 into the operating station, between the rollers 11 through 14 and the embossing roller 15, there would also be the danger that the materials might be prematurely activated, which would give rise to obvious difficulties, and there might even be the risk of the foil 5 or the web 1 to be decorated thereby being caused to melt right through, thereby interrupting operation of the machine and probably requiring extensive cleaning and similar operations.

As shown in FIGS. 2 and 3 therefore, in accordance with the principles of this invention, the roller cage or part-circular configuration which is best seen in FIG. 1, as formed by the pairs of pressure rollers 11 through 14 can be caused to depart from the part-circular configuration shown, to assume the stretched-out or substantially straight configuration best visible in FIG. 2. That position represents the starting position, for initiating operation of the embossing station. The pairs of rollers 11 through 14 can then be moved from the starting position shown in FIG. 2 progressively towards the embossing roller 15, with the progression in such approach movement of the pressure rollers commencing with the inner rollers, for example the rollers indicated at 12 and 13, and then progressing to the further outwardly disposed rollers, as indicated at 11 and 14 respectively. It will be seen therefore that, when the web of material 1 with the decorative foil 5 laid thereon has been passed over the pressure rollers 11 through 14, as shown in FIG. 2, the pairs of rollers 11 through 14 can then be successively moved in the above-indicated sequence, namely 12, 13 and then 11, 14, so as to move into the position in which they are applied against the peripheral surface of the roller 15, thereby pressing the web 1 and the foil 5 against the roller 15, without giving rise to any substantial premature activation of the foil 5 or the web 1, which could cause defects in the decoration applied to the web 1 by the foil 5, or damage to the materials involved. FIG. 3 shows the manner in which the pairs of rollers 11 through 14 are brought into positions of engagement with the surface of the roller 15, in a stepwise manner.

As will be clearly seen from FIGS. 2 and 3, each pair of rollers 11 through 14 is mounted on a respective rocker member as indicated at 11', 12', 13' and 14' respectively. The rocker members 11' through 14' are in turn mounted pivotally on respective angle levers or bell crank levers 36, 37, 38 and 39 respectively, which in turn are operatively connected to the control units 16 through 19.

Each of the levers 36 and 37, being therefore the levers carrying the two outward pairs of rollers 11 and 14 respectively, are mounted pivotally on a respective corner member 32 and 33, being rotatable about a respective axis 40 and 41 disposed at least substantially centrally along the length of the respective member 32, 33. The rocker members 11' and 14' are each pivotally carried on one end of the respectively associated angle levers 36 and 37, while the control units 16 and 19, respectively engage the other end of the respective angle levers 36 and 37. This arrangement can be clearly seen for example from FIG. 2.

The members 32 and 33 are each pivotal about a respective main axis as indicated at 42 and 43, which extends parallel to the axis of rotation of the cylinder 15 and thus also parallel to the axes of rotation of the rollers 11 through 14 which are therefore also parallel to the roller 15.

The main axes 42 and 43 also serve at the same time as mounting axes for the two inner angle levers 38 and 39, being the levers which therefore carry the inner pairs of rollers 12 and 13. One end of each of the levers 38 and 39 is mounted on the respective main axis 42 and 43. The other end of the respective levers 38 and 39 carries the respective rocker members 12' and 13'. The associated control units 17 and 18 are connected to the angle levers 38 and 39, at a position such as to be operative substantially centrally between the point of connection of the rocker members 12', 13' and the main axes 42 and 43, respectively.

It should be noted that the angle levers 36 and 37 are normally retained by a spring loading in the position shown in solid lines in FIG. 3, relative to the carrier members 32 and 33, the spring loading means not being shown in the drawing in order to avoid excessively encumbering the drawings. It is only when the carrier members 32 and 33 are moved into the dash-dotted line positions as indicated at 34 and 35 in FIG. 3, by suitable actuation of the control units 17 and 18, in a manner which will be described hereinafter, that the members 32 and 33 come into a position of bearing against suitable abutments (not shown). Then, upon actuation of the cylinder units 16 and 19 for displacing the angle levers 36 and 37, the angle levers 36 and 37 can be caused to tilt towards the roller 15, against the action of the above-mentioned return springs.

The construction of the illustrated arrangement having been described, the mode of operation of the apparatus in carrying out the embossing method in accordance with the present invention will now be described:

Before the web 1 of material and the embossing foil 5 are introduced into the apparatus, the roller cage or part-circular configuration formed by the pressure rollers 11 through 14 is moved into the extended position shown in FIG. 2, by suitable actuation of the control cylinder units 16 through 19, whereby it is possible for the web 1 with the foil 5 thereon to be taken freely past the roller 15 at a sufficient spacing therefrom. As the web of material 1 with foil 5 thereon is not applying any force to the dancer roller 21, the roller 21 is in its most downward limit position. During the initial phase of heating up the embossing roller 15 by suitable heating means, and in breaks in operation of the machine, the roller 15 rotates at a reduced speed, relative to the normal speed of rotation for steady operation of the apparatus, in order to prevent the roller 15 from cooling down on one side thereof.

In the phase of starting up the apparatus, the web of material 1 with the embossing foil 5 thereon is passed around the periphery of the cooling cylinder 23, and the pressure roller 24 is then moved into a position in which it bears against the peripheral surface of the cooling cylinder 23, and thus presses the web 1 and the foil 5 thereagainst, by suitable actuation of the cylinder 25. The drive for the cooling cylinder 23 is then switched on, and the rotary speed of the roller 15, which, as indicated above, is rotating at a provisionally reduced speed, is increased, with the result that the web 1 and the foil 5 are drawn into the apparatus at a low speed. During that period of time, the function of the dancer roller 21 is cut out and the drive driving the roller 15 is so controlled that the roller 15 rotates somewhat more rapidly than the speed corresponding to the speed of movement of the web 1 with the foil 5. The control function performed by the dancer roller 21 can come into operation only when the pressure rollers 11 through 14 are in their operative position of bearing against the roller 15.

As soon as the machine has started up, the inner pairs of rollers 12 and 13 are moved into the position of bearing against the material 1 as it passes around the periphery of the roller 15, by suitable actuation of the control piston cylinder units 17 and 18, this being the solid-line position of the arrangement as shown in FIG. 3. To put the apparatus into that operating configuration, only the angle levers 38 and 39 are caused to pivot about the main axes 42 and 43. The pressure rollers 12 and 13 can take up a position of satisfactorily bearing against the peripheral surface of the roller 15, that is to say, a position such that each roller of each pair is in appropriate contact with the roller 15, by virtue of the provision of the rocker members 12' and 13' which thus permits compensating movements of the respective pairs of rollers about the respective angle levers 38 and 39.

It will be appreciated that when the pressure rollers 12 and 13 are moved into their operative position shown in FIG. 3, in which they press the web 1 of material with the foil 5 thereon against the peripheral surface of the roller 3, the path to be followed by the web of material 1 in passing through the apparatus is increased in length. However, that difference in the length of the path of movement of the web 1 can be compensated by a suitable movement of the dancer roller 21, being therefore in an upward direction, as indicated in FIG. 3.

As soon as the pressure rollers 12 and 13 are in their operative position of urging the web of material 1 cleanly against the periphery of the roller 15, the control piston cylinder units 16 and 19 are actuated. When that occurs, as the angle levers 36 and 37 are spring-loaded to their rest position as shown in FIG. 3, the carrier members 32 and 33 are first lifted by the actuating travel of the units 16 and 19, until the carrier members 32 and 33 take up the position shown in dash-dotted lines in FIG. 3, and indicated at 34 and 35 respectively. In that position, the carrier members 32 and 33 bear against abutments, thus defining a limit position in respect of such upward movement of the carrier members. Upon continuing actuation of the units 16 and 19, the angle levers 36 and 37 are thus caused to pivot about their respective mounting axes on the carrier members 32 and 33, so that the rollers 11 and 14 in their respective rocker members 11' and 14' are pivoted inwardly towards the roller 15, and thus press the web of material 1 with foil 5 thereon against the peripheral surface of the roller 15, thereby completing the part-circular configuration as shown in FIG. 1.

In the course of the actuating movement of the cylinder units 16 and 19 and the corresponding movements of the pressure rollers 11 and 14, the length of the path of movement to be followed by the web 1 and the foil 5 through the machine is also increased. That increase in length can be compensated at the entry side of the arrangement by suitable rotary movement of the supply rolls 2 and 6, thus feeding additional material into the arrangement, and at the exit side by a change in the position of the dancer roller 21.

The apparatus is now in a proper condition of readiness for operation, and it is then only necessary to achieve the appropriate condition of equilibrium as between the peripheral speed of the roller 15 and the peripheral speed of the cooling cylinder 23, by suitable operation of the dancer roller 21.

As already indicated, the above-described method and apparatus in accordance with the invention make it possible to achieve considerably higher operating speeds than those possible with the known apparatuses. The operating speed can in fact be increased by up to five times.

The method and apparatus according to this invention can be used in a very wide range of different situations. They can be used for example in relation to magnetisable as well as metal and coloured foils. For example, magnetic or identification strips can be applied to tickets, by means of the described method and apparatus.

Particular embossing decorative effects may be achieved when proceeding in accordance with the present invention, if the surface of the embossing roller 15, and possibly also one or more of the pressure rollers 11 through 14, is engraved in accordance with a given pattern, that is to say, it has a pattern comprising raised and depression areas or portions, with the decorative layer of the embossing foil being transferred to the web of material to be decorated thereby, only over the surface portions which are the raised portions of the pattern.

In addition, while in the described embodiment the embossing roller 15 is heated by any suitable means, it would be possible also or only for at least one of the pressure rollers to be heated. It would also be possible to use other suitable pressure elements, in place of the pressure rollers.

It will be seen therefore that, with the above-described method and apparatus in accordance with this invention, an embossing or textured foil can be applied to a flexible material at high operating speed, securely but without detrimentally affecting the quality of either the material or the decoroative foil. In addition, the fact that the decorative foil is pressed on to the flexible material by a repeated pressing action produced by the rollers 11 through 14 successively pressing the material 1 and the foil 5 against the peripheral surface of the roller 15 means that the foil is securely fixed to the material, without the need for an operating temperature such as to damage the materials used. Furthermore, the material and/or the foil does not have to be repeatedly heated in a number of separate heating operations, but instead is heated substantially continuously by being pressed against the heated peripheral surface of the roller 15 forming the support or backing member therefor. The fact that the material is in contact with the heated surface of the roller 15 over a substantial distance along said surface provides a uniform heating effect. It will be appreciated that that is one of the factors which contributes to the increased operating speed of the apparatus of the invention, which has been found to be capable of operating at speeds of more than 150 meters of material per minute, in contrast to the usual speeds of operation of previously known apparatuses which were limited to a maximum speed of around 30 metres per minute. As moreover there is no possibility of the web 1 and the foil 5 cooling down between the individual pressure rollers of the pressing arrangement, there is a considerably reduced likeliood of the decorative image applied suffering from distortion.

Various modifications and alterations may be made in the above-described method and apparatus, without thereby departing from the spirit and scope of the present invention.

What is claimed is:

1. Apparatus for applying an embossing foil to a portion of flexible material, comprising:
    an embossing roller for embossing:
    said flexible material:
    means for heating said embossing roller;
    an array of spaced apart pressure rollers having axes parallel to said embossing roller for movement into cooperation with said embossing roller to press said flexible material and embossing foil against said embossing roller, said array of pressure rollers including a sub-array of inner pressure rollers;
    and means for controlling movement of said array of pressure rollers relative to said embossing roller in pressing said flexible material and embossing foil against said embossing roller to cause said sub-array of inner pressure rollers to be first displaced to engage said embossing roller and thence to cause said pressure rollers at respective sides of said inner pressure rollers sub-array to be progressively brought into engagement with said embossing roller.

2. The apparatus as set forth in claim 1 wherein said pressure rollers are arranged in a first group and a second group symmetrically disposed with respect to said embossing roller, said pressure rollers of said first and second group corresponding to each other relative to a plane of symmetry of said array of pressure rollers and being movable in substantially like manner.

3. The apparatus as set forth in claim 2 wherein each of said group comprises four pressure rollers comprised of first and second pressure rollers rotatably mounted adjacent to each other on a first rocker member and third and fourth rollers mounted adjacent to each other on a second rocker member, said first and second rollers of each group constituting an inner pressure roller sub-array, each of said rocker members of each group being pivotally mounted on respective first and second angle levers about an axis extending parallel to said axes of said pressure rollers, a first control means being connected to said first angle lever at a point substantially midpoint thereof to pivot said first angle lever about a main axis extending parallell to said axes of said pressure rollers for applying said first and second rollers against said embossing roller, a carrier member being rotatably mounted about said main axis, said second angle lever being mounted pivotally on said carrier member, and a second control means being connected to said second angle lever at a point remote from said respective rocker member to move said second angle lever jointly with said carrier member.

4. The apparatus as set forth in claim 3 and further comprising spring-loaded means for resiliently holding said second angle lever of each of said groups in a rest position relative to an associated carrier member, said carrier member reaching a pivoted position for said pressure rollers mounted on said second rocker member to be applied against said embossing roller defined by an abutment, said second angle lever being pivotable from a rest position towards said embossing roller against said spring loaded means.

5. The apparatus as set forth in claim 1 and further cmprising a drive means for driving said embossing roller.

6. The apparatus as set forth in claim 5 wherein said embossing roller drive means includes a direct current motor.

7. The apparatus as set forth in claim 1 and further comprising a transmission means for driving said embossing roller, said transmission means including a slipping clutch having an adjustable slipping torque.

8. The apparatus as set forth in claim 5 and further comprising a dancer roller positioned downstream of said embossing roller for adjusting drive torque in dependence on tension on said material.

9. The apparatus as set forth in claim 8 wherein means for maintaining tension of said flexible material and embossing foil at least substantially constant is disposed upstream of said embossing roller.

10. The apparatus as set forth in claim 8 and further comprising means for mounting supply rolls of said flexible material and said embossing foil and means associated with said supply rolls for maintaining said a least substantially constant tension.

11. The apparatus as set forth in claim 9 and further comprising braking rollers engageable with said flexible material and said embossing foil for retarding same to maintain said at least substantially constant tension.

12. The apparatus for applying an embossing foil to a flexible material, which comprises: an embossing roller for embossing said flexible material;

means for heating at least a peripheral surface of said embossing roller;

spaced apart pressure elements arranged to form first and second arrays displaceable between a first position wherein said pressure elements extend in a partial circular configuration about said embossing roller to press said flexible material and said embossing foil against said embossing roller and a second position wherein said pressure elements are spaced from said embossing roller, said second array comprising first and second sub-array on respective sides of said first array; and actuating means for sequentially displacing said first array and thence said second array from said second position to said first position thereby to progressively provide said partial circular configuration about said embossing roller and to apply said flexible material and said embossing foil against said embossing roller.

13. The apparatus as set forth in claim 12 and further comprising first and second elongated carrier members for supporting said array of pressure rollers, said elongated carrier members having first and second ends and mounted proximate to said embossing roller at said first end pivotally about an axis parallel to an axis of said embossing roller, a first lever means pivotally mounted about said axis of said carrier member, a second lever means pivotally mounted about each of said carrier members at a position intermediate said ends thereof, a mounting means pivotable on each said first and second lever means and carrying said pressure roller, said pressure rollers constituting said first array being mounted on said mounting means carried by said first lever means and said pressure rollers constituting said second array being mounted on said mounting means carried by said second lever means, said actuating means being connected to said first and second lever means to produce said sequential displacement of said arrays.

14. The apparatus as set forth in claim 12 wherein said actuating means includes piston-cylinder units.

15. The apparatus as set forth in claim 12 and further comprising spring means for urging said pressure rollers of said arrays to said second position.

* * * * *

UNITED STATES PATENT AND TRADEMARK OFFICE
CERTIFICATE OF CORRECTION

PATENT NO. : 4,802,949
DATED : February 7, 1989
INVENTOR(S) : Reinwald Mitsam

It is certified that error appears in the above-identified patent and that said Letters Patent is hereby corrected as shown below:

Column 4, line 7, "satisactory", should read -- satisfactory --.

Column 12, line 24, after "embossing", delete the colon -- : --.

Column 13, line 15, "cmprising", should read -- comprising --.

Column 13, line 36, "a", should read -- at --.

Signed and Sealed this

Fifth Day of December, 1989

*Attest:*

JEFFREY M. SAMUELS

*Attesting Officer*     *Acting Commissioner of Patents and Trademarks*